United States Patent [19]

Galimberti et al.

[11] Patent Number: 5,565,533
[45] Date of Patent: Oct. 15, 1996

[54] PROCESS FOR PREPARING AN ETHYLENIC COPOLYMER

[75] Inventors: Maurizio Galimberti, Milan; Luigi Resconi, Ferrara; Enrico Albizzati, Arona, all of Italy

[73] Assignee: Montell Technology Company bv, Netherlands

[21] Appl. No.: 471,634

[22] Filed: Jun. 6, 1995

Related U.S. Application Data

[63] Continuation of Ser. No. 357,099, Dec. 15, 1994, abandoned, which is a continuation of Ser. No. 79,005, Jun. 18, 1993, abandoned.

[30] Foreign Application Priority Data

Jun. 18, 1992 [IT] Italy .................................. MI92A1498
May 11, 1993 [IT] Italy .................................. MI93A0943

[51] Int. Cl.$^6$ ...................................................... C08F 2/04
[52] U.S. Cl. .......................... 526/127; 526/153; 526/160; 526/170; 526/943; 502/155
[58] Field of Search ................................. 526/127, 153, 526/160, 170, 943

[56] References Cited

U.S. PATENT DOCUMENTS

| | | | |
|---|---|---|---|
| 4,952,540 | 8/1990 | Kioka et al. | 502/9 |
| 5,091,352 | 2/1992 | Kioka et al. | 502/103 |
| 5,229,478 | 7/1993 | Floyd et al. | 526/160 |

FOREIGN PATENT DOCUMENTS

| | | |
|---|---|---|
| 0347128 | 12/1989 | European Pat. Off. . |
| 0535230 | 4/1993 | European Pat. Off. . |
| WO92/033 | 1/1992 | WIPO . |

OTHER PUBLICATIONS

Ewen J., J. Am. Chem. Soc., 1987, 109, 6544–45 and Supplementary Material.
F. R. W. P. Wild, M. Wasiucionek, G. Huttner and H. H. Brintzinger, J. Organomet. Chem. 288, 1985, 63–67.
W. A. Hermann et al., Angew. Chem. Int. Ed. Engl. 1989, 28, 1511–12.
Organometallics, 1990, 9, 3098–3105.

*Primary Examiner*—David W. Wu
*Attorney, Agent, or Firm*—Bryan Cave, LLP

[57] ABSTRACT

A process for the preparation of an ethylene/1-butene or ethylene/1-butene/diene elastomer by slurry polymerization of the monomers in a polymerization medium consisting mainly of an excess of the 1-butene maintained in liquid form, performed in the presence of a catalyst based on a metallocene compound of Ti, Zr or Hf. This process is exempt from occurrence of reactor fouling and enables the recovery of the polymer without the use of steam as a stripping agent.

9 Claims, No Drawings

PROCESS FOR PREPARING AN ETHYLENIC COPOLYMER

This is a continuation of U.S. application Ser. No. 08/357,099, filed Dec. 15, 1994, now abandoned which is a continuation of U.S. application Ser. No. 08/079,005, filed Jun. 18, 1993 now abandoned.

The present invention relates to a process for preparing an elastomeric copolymer. More particularly, it relates to a slurry polymerization process for preparing an elastomeric ethylene-based copolymer.

Among the ethylene-based elastomeric copolymers, only ethylene-propylene (EPM) and ethylene-propylene-diene (EPDM) elastomers are produced on a commercial scale, at the date of the present invention.

The industrial production of EPM and EPDM elastomers is currently carried out in the presence of Ziegler-Natta vanadium-based catalysts, by solution or slurry processes.

In the solution processes, the comonomers are dissolved in a solvent, commonly hexane, in which the formed polymer is soluble. In the slurry processes, the reaction medium is essentially formed by an excess of the liquid propylene which acts as a polymerization diluent, and the polymer is formed as a solid precipitate suspended in the liquid phase.

A slurry process offers a number of advantages over a solution process, namely:

no stirring viscosity problems;

very homogeneous reaction medium;

easier removal of the reaction heat;

increased reactor throughput owing to higher concentration of the polymer in the medium;

higher polymerization yields;

capability of producing very high MW polymers;

energy savings for the recovery of the polymer;

lower investment and production costs.

However, a major problem of a suspension process arises from the adhesive properties of the rubbery material. As a matter of fact, the solid particles of the polymer have a tendency to stick to one another or to the wall surface and to the agitating element of the reactor. This worsens to a large extent the diffusion of ethylene in the reaction medium and, what is more, causes intensive fouling of the reactor, thus rendering the preparation of the polymer very difficult.

In order to avoid such problems, a solvent, such as toluene or cyclohexane, can be added to the reaction medium, which acts both as antifouling agent and as vehicle of the catalyst system. The use of a low boiling diluent, such as propane, has also been proposed. As a result, however, the above indicated advantages of a slurry process are drastically decreased.

Another solution which has been proposed to render the process in bulk possible, is the addition of antistatic agents into the polymerization reactor. This solution, however, is not completely satisfactory and, moreover, has the drawback of introducing undesired compounds in the final product.

Recently, processes have been disclosed for the preparation of elastomeric ethylene copolymers in the presence of metallocene/alumoxane catalysts.

European patent application No. 347,128 discloses a process for producing an ethylene/α-olefin elastomer in slurry polymerization, utilizing a zirconocene/alumoxane catalyst supported on a silica gel support. The examples relate to the preparation of ethylene/propylene copolymers in liquid propylene. It is said that, unless the supported catalyst is prepolymerized with ethylene or another α-olefin before being used in the slurry polymerization process, the reactor fouling invariably occurs to a very large extent.

In European patent application No. 535,230, a slurry polymerization process for preparing an ethylene-based copolymer has been proposed, which prevents the occurence of fouling. This process is carried out in the presence of both a polysiloxane additive and a silica gel supported zirconocene/methylalumoxane catalyst. All of the examples relate to ethylene/propylene elastomers. In the comparative examples in which no polysiloxane additive has been used, clogging and jamming have been observed.

The Applicants have now unexpectedly found that a process for the preparation of an ethylene/α-olefin or ethylene/α-olefin/polyene elastomeric copolymer can be succesfully performed as a slurry process with the liquid α-olefin as the reaction medium, in the presence of a metallocene-based catalyst, without resorting to supporting or prepolymerization treatment of the catalyst or to the use of additives, when the α-olefin monomer is 1-butene.

Therefore, it is an object of the present invention a process for the preparation of an elastomeric ethylene-based copolymer, comprising the slurry polymerization reaction of a mixture which comprises ethylene, 1-butene and, optionally, a minor amount of a polyene, in a polymerization medium consisting essentially of liquid 1-butene together with dissolved ethylene gas, in the presence of catalytic amounts of a non pre-polymerized catalyst based on a metallocene compound of Ti, Zr or Hf.

Catalysts suitable for the process of the present invention can be prepared, for example, by contacting:

(A) a metallocene compound of the formula (I):

$$(C_5R^1_{5-m})R^2_m(C_5R^1_{5-m})MQ_2 \qquad (I)$$

optionally pre-reacted with an organometallic aluminium compound of the formula (II):

$$AlR^3_{3-z}H_z \qquad (II)$$

wherein M is a metal selected from the group consisting of Ti, Zr and Hf; $C_5R^1_{5-m}$ groups, same or different from each other, are equally or differently substituted cyclopentadienyl rings; the substituents $R^1$, same or different from each other, are hydrogen atoms, alkyl, alkenyl, aryl, alkylaryl or arylalkyl radicals containing from 1 to 20 carbon atoms, which may also contain Si or Ge atoms, or $Si(CH_3)_3$ groups, or two or four substituents $R^1$ of the same cyclopentadienyl ring can form one or two rings having from 4 to 6 carbon atoms; $R^2$ is a bridging group which links the two cyclopentadienyl rings and is selected among $CR^1_2$, $C_2R^1_4$, $SiR^1_2$, $Si_2R^1_4$, $GeR^1_2$, $Ge_2R^1_4$, $R^1_2SiCR^1_2$, $NR^1$ or $PR^1$, wherein the substituents $R^1$, same or different from each other, are defined as above; the substituents Q, same or different from each other, are hydrogen, halogen atoms, OH, SH, $R^1$, $OR^1$, $SR^1$, $NR^1_2$ or $PR^1_2$, wherein the substituents $R^1$, same or different from each other, are defined as above; the substituents $R^3$, same or different from each other, are alkyl, alkenyl or alkylaryl radicals containing from 1 to 10 carbon atoms, which may also contain Si or Ge atoms; m can be 0 or 1; z can be 0 or 1; and (B) an alumoxane compound, optionally in admixture with an organometallic aluminium compound of the formula (II):

$$AlR^3_{3-z}H_z \qquad (II)$$

wherein z and the substituents $R^3$ are as defined above, or at least one compound capable of reacting with the metallocene compound to give a cationic alkyl metallocene.

The molar ratio between the aluminium and the metal of the metallocene compound is generally comprised between about 100 and 10,000, preferably between about 300 and 5,000, more preferably between about 500 and 2,000.

Preferred metallocene compounds suitable for the process according to the present invention are those of the formula (I) in which the metal M is zirconium, namely zirconocenes, and the substituents Q are chlorine atoms or hydrocarbyl groups containing from 1 to 7 carbon atoms, preferably methyl groups.

In order to be able to incorporate the 1-butene units into the polymeric chain, it is preferred that not all of the $R^1$ substituents of the same cyclopentadienyl ring be a cumbersome radical. Thus, suitable metallocenes are those which have at least one and, more preferably, at least two $R^1$ substituents of the same cyclopentadienyl ring which are an hydrogen atom. Alternatively, metallocenes in which all the $R^1$ substituents form aromatic rings are also suitable.

Non limitative examples of metallocene compounds of the formula (I) are:
$(Cp)_2ZrCl_2$ $(MeCp)_2ZrCl_2$ $(Me_2Cp)_2ZrCl_2$
$(Ind)_2ZrCl_2$ $(H_4Ind)_2ZrCl_2$ $Me_2Si(Cp)_2ZrCl_2$
$Me_2Si(MeCp)_2ZrCl_2$ $Me_2Si(Ind)_2ZrCl_2$ $C_2H_4(Ind)_2ZrCl_2$
$C_2H_4(H_4Ind)_2ZrCl_2$ $Me_2Si(Ind)_2ZrCl_2$ $Ph(Me)Si(Ind)_2ZrCl_2$
$Ph_2Si(Ind)_2ZrCl_2$ $Me_2C(Flu)(Cp)ZrCl_2$ $C_2Me_4(Ind)_2ZrCl_2$
$Me_2SiCH_2(Ind)_2ZrCl_2$ $C_2H_4(2-MeInd)_2ZrCl_2$ $C_2H_4(3-MeInd)_2ZrCl_2$
$C_2H_4(4,7-Me_2Ind)_2ZrCl_2$ $C_2H_4(5,6-Me_2Ind)_2ZrCl_2$
$C_2H_4(2,4,7-Me_3Ind)_2ZrCl_2$ $C_2H_4(3,4,7-Me_3Ind)_2ZrCl_2$
$C_2H_4(2-MeH_4Ind)_2ZrCl_2$ $C_2H_4(4,7-Me_2H_4Ind)_2ZrCl_2$
$C_2H_4(2,4,7-Me_3H_4Ind)_2ZrCl_2$ $Me_2Si(2-MeInd)_2ZrCl_2$
$Me_2Si(3-MeInd)_2ZrCl_2$ $Me_2Si(4,7-Me_2Ind)_2ZrCl_2$
$Me_2Si(5,6-Me_2Ind)_2ZrCl$ $Me_2Si(2,4,7-Me_3Ind)_2ZrCl_2$
$Me_2Si(3,4,7-Me_3Ind)_2ZrCl_2$ $Me_2Si(2-MeH_4Ind)_2ZrCl_2$
$Me_2Si(4,7-Me_2H_4Ind)_2ZrCl_2$ $Me_2Si(2,4,7-Me_3H_4Ind)_2ZrCl_2$
$Me_2Si(Flu)_2ZrCl_2$ $C_2H_4(Flu)_2ZrCl_2$
wherein Me=methyl, Cp=cyclopentadienyl, Ind=indenyl, Flu=fluorenyl, Ph=phenyl, $H_4Ind$=4,5,6,7-tetrahydroindenyl.

The alumoxane compound suitable for the process according to the present invention is a linear, branched or cyclic compound containing at least one group of the formula (III):

wherein the $R^4$ substituents, same or different from each other can be a $-O-Al(R^4)_2$ group or a $R^1$ substituent wherein $R^1$ is as defined above, and, optionally, some of the $R^4$ substituents can be an halogen atom.

In particular, alumoxane compounds which can be used in the process of the present invention are the linear alumoxanes represented by the formula (IV):

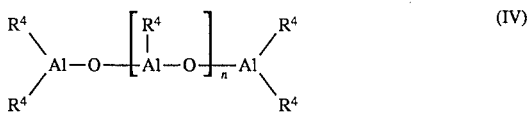

wherein n is 0 or an integer from 1 to 40, and the cyclic alumoxanes represented by the formula (V):

wherein n is an integer from 2 to 40.

In the formulas (IV) and (V), $R^4$ is as defined above, preferably is a $C_1-C_4$ hydrocarbon group and, more preferably, a methyl group or isobutyl group. Non limitative examples of alumoxane compounds suitable for the process of the present invention are methylalumoxane (MAO) and tetraisobutyl-dialumoxane (TIBAO).

Non limitative examples of organometallic aluminium compounds of the formula (II) are:
$Al(Me)_3$, $Al(Et)_3$, $AlH(Et)_2$, $Al(iBu)_3$, $AlH(iBu)_2$, $Al(iHex)_3$, $Al(C_6H_5)_3$, $Al(CH_2C_6H_5)_3$, $Al(CH_2CMe_3)_3$, $Al(CH_2SiMe_3)_3$, $Al(Me)_2iBu$, $Al(Me)_2Et$, $AlMe(Et)_2$, $AlMe(iBu)_2$, $Al(Me)_2iBu$, $Al(Me)_2Cl$, $Al(Et)_2Cl$, $AlEtCl_2$, $Al_2(Et)_3Cl_3$, wherein Me=methyl, Et=ethyl, iBu=isobutyl, iHex=isohexyl. Those preferred are the trimethylaluminium (TMA) and the triisobutylaluminium (TIBAL).

Non limitative examples of compounds capable of reacting with the metallocene compound to give a cationic alkyl metallocene are those represented by the formula $Y^+Z^-$, wherein $Y^+$ is a Brönsted acid, capable of donating a proton and of irreversibly reacting with a Q substituent of the compound of the formula (I), and $Z^-$ is a noncoordinating, compatible anion, capable of stabilizing the active catalyst species and sufficiently labile to be displaced by an olefinic substrate. Compounds of this type are described, for example, in the Published International Patent Application WO 92/00333, the contents of which are understood to be incorporated in the present description as a result of its mention.

The slurry polymerization process of this invention can be performed either as a batchwise process or as a continuous process.

The polymerization temperature generally ranges from about 0° C. to about 200° C. and, particularly, from about 20° C. to about 100° C.

According to a particularly advantageous embodiment of the present invention, after the slurry polymerization reaction is completed, the unreacted gaseous ethylene is flashed from the suspension of the polymer in the reaction medium which leaves the reactor. The temperature of the suspension is then raised until a solution of polymer is formed in the reaction medium which, after ethylene flashing, is substantially composed of liquid butene. This solution can be treated in a blender and, thereafter, recovery of the polymer is obtained by evaporation of the butene solvent. This step can be advantageously performed in equipment such as a devolatilizing extruder, thus obtaining the product directly in a processable form, i.e. bales, pellets etc.

The copolymers obtainable from the process of this invention generally contain from 35% to 90%, preferably from 50% to 85%, by mole of ethylene units, from 5% to 65%, preferably from 15% to 50%, by moles of units deriving from 1-butene, and from 0% to 5%, preferably from 0% to 3%, by moles of units deriving from the polyene.

The copolymers having up to about 80% by mole of ethylene units are substantially amorphous. The crystallinity of the copolymers appears for ethylene contents higher then about 80%, and the heat of fusion ($\Delta H_f$) increases as the amount of ethylene units gets nearer to the upper limit of 90% by moles.

Polyenes which can be used in the process of the present invention are:
polyenes able to give unsaturated unit, for example:
 non-conjugated straight dienes, such as 1,4-hexadiene trans, 1,4-hexadiene cis, 6-methyl-1,5-heptadiene, 3,7-dimethyl-1,6-octadiene, 11-methyl-1,10-dodecadiene;
 monocyclic diolefins such as, cis-1,5-cyclooctadiene and 5-methyl-1,5-cyclooctadiene;
 bicylic diolefins such as, 4,5,8,9-tetrahydroindene and 6- and/or 7-methyl-4,5,8,9-tetrahydroindene;

alkenyl or alkyliden-norbornenes such as, 5-ethyliden-2-norbornene, 5-isopropyliden-2-norbornene, exo-5-isopropenyl-2-norbornene;

polycyclic diolefins, such as, bicyclopentadiene, tricyclo[6.2.1.0$^{2,7}$]-4,9-undecadiene and the 4-methyl derivative thereof;

non-conjugated diolefins able to cyclopolymerize, such as 1,5-hexadiene, 1,6-heptadiene, 2-methyl-1,5-hexadiene;

conjugated diolefins, such as butadiene or isoprene.

The elastomeric copolymers obtainable from the process of the present invention can be cured according to the methods known for the EPM and EPDM elastomers, for example by operating in the presence of peroxides or sulfur. The obtained products are endowed with valuable elastomeric properties, and can be utilized in the applications typical of the α-olefinic elastomers, such as the EPM and EPDM elastomers.

By means of the process of the present invention, it is thus possible to prepare an ethylene/α-olefin or ethylene/α-olefin/polyene elastomeric copolymer by a slurry reaction performed in the liquid α-olefin comonomer, avoiding the occurring of fouling, and without the need to use additives or to utilize the metallocene catalyst in a supported and prepolymerized form.

Another advantage of the process of this invention, is that the recovery of the polymer can be performed without the need to employ steam as a stripping agent.

The following examples are supplied for purely illustrative and not limiting purpose.

CHARACTERIZATIONS

DSC analysis have been carried out on a DSC7 Perkin Elmer apparatus, from −25° C. to 180° C., at scanning speed of 10° C./minute. The contents of 1-butene in the copolymer have been determined by $^{13}C$-N.M.R. analysis, carried out by means of a BRUKER AC200 apparatus, at a temperature of 120° C. The samples have been prepared dy dissolving about 300 mg of the polymer in 2.5 mg of a 3:1 mixture of trichlorobenzene/$C_2D_2Cl_4$. The spectra have been recorded with the following parameters:

relaction delay=12 sec;
counts number=2000÷2500.

The intrinsic viscosities (I.V.) have been measured in tetrahydronaphthalene at 135° C.

The distributions of molecular weights ($M_w/M_n$) have been determined by GPC carried out by means of a WATERS 150 apparatus in orthodichlorobenzene at 135° C.

For the physical-mechanical characterization of the polymers, blends have been prepared by means of a calender, having the following composition:

100 g of copolymer;
30 g of carbon black 550;
5 g of ZnO;
1 g of stearic acid;
1 g of Sartomer 206, commercial product of Ancomer;
4.5 g of Peroximon F40, commercial product of Atochem.

The obtained blends have been compression moulded using a 35 ton press, at a pressure of 200 Kg/cm$^2$, at a temperature of 165° C. and for a time period of 30 minutes. From the obtained specimens (200×120×2 mm), dumbbells have been obtained for the determination of the tension set (200%, 1 minute, 23° C.) and of the stress-strain curve. The elongation speed was of 500 mm/minute.

CATALYST PREPARATION

DIMETHYLSILANDIYL-BIS(FLUORENYL) ZIRCONIUM DICHLORIDE a) Preparation of dimethylbis(fluorenyl)silane 120 ml (300 mmol) of a 2.5M solution of n-butyllithium in hexane were added dropwise to a stirring solution of 50 g (300 mmol) of fluorene dissolved in 400 ml of tetrahydrofuran (THF), mantaining the temperature of the solution at 0° C. throughout the addition. After addition was complete, the solution was warmed to room temperature and stirring continued for 5 hours after gas evolution had ceased. The fluorene anion formed in this step was then added drowise to a stirring solution of 0.15 mol dimethyldichlorosilane dissolved in 100 ml THF and maintained at 0° C. during the addition. After the addition was complete, the solution was warmed to room temperature, and stirring was continued for 17 hours. The reaction was quenched with the addition of 150 ml water, and the organic layer was dried over magnesium sulfate. The solvents were removed under vacuum and the solids collected were recrystallized from hexane, yielding 37.8 of dimethylbisfluorenylsilane ($Me_2SiFlu_2$), whose structure and chemical purity were confirmed by GC-MS and $^1H$ NMR.

b) Preparation of dimethylsilandiyl-bis(fluorenyl)zirconium dichloride 8.5 g (0.0219 mol) of the $Me_2SiFlu_2$ ligand obtained above were dissolved in 75 ml of diethylether (ErgO). 31.25 ml of methyllithium (1.4M solution in $Et_2O$) were added dropwise, maintaining the solution at 0° C. during the addition. After addition was complete, the slurry was warmed to room temperature and stirring was continued for 5 hours after the gas evolution had ceased. Solvents were then removed by filtration, and the bright yellow powder that was obtained was washed with $Et_2O$ and pentane to remove any unreacted methyllithium and ligand. The so obtained ligand dianion was then resuspended in 100 ml $Et_2O$ and added drowise to a rapidly stirring suspension of 5.1 g (0.0219 mol) of $ZrCl_4$ in pentane maintained at −78° C. during the addition. After addition was complete, the slurry was allowed to warm to room temperature, and stirring continued for 17 hours. The slurry was then filtered, and the bright red solids that were collected were washed with $Et_2O$ and pentane prior to being dried under vacuum at room temperature. Yield was 13.56 g. This product was used without further purification in the following examples.

ETHYLENE-BIS(4,5,6,7-TETRAHYDROINDENYL) ZIRCONIUM DICHLORIDE a) Preparation of 1,2-bis(indenyl)ethane The preparation described in "Ewen J., J. Am. Chem. Soc., 1987, 109, 6544, Suppl. mat." was carried out.

In a 2 liter 2-necked round-bottomed flask, 50.8 g of indene (437 mmols) were dissolved under inert atmosphere with 500 ml of tetrahydrofuran and cooled to −78° C. Then, 175 ml of n-butyl lithium (2.5M in hexane, 437.5 retools) were slowly added dropwise over 1 hour. The mixture was allowed to heat up to room temperature and was kept stirred for 4 hours.

Then the mixture was cooled to −78° C. and 40.42 g of 1,2-dibromoethane (215 mmols) dissolved in 100 ml of tetrahydrofuran were added dropwise over 20 minutes. At the end of the addition the temperature was raised to 50° C. and, after stirring for 12 hours, was cooled up to room temperature and 20 ml of water were added.

The organic phase was dried and the residue was extracted with pentane.

By evaporation under vacuum 28.65 g of product were obtained. The yield was 51.6%.

b) Preparation of ethylene-bis(indenyl)zirconium dichloride

In a 250 ml two-necked round-bottomed flask, provided with cooler, 8 g (31 mmols) of 1.2-bisindenylethane and 100 ml of anhydrous tetrahydrofuran were fed, thus obtaining a yellow solution.

After cooling to −78° C., 40 ml of n-butyllithium (1.6M in hexane, 64 mmols) were added dropwise in the solution thus obtaining a precipitate which, by heating, dissolves again giving a reddish-yellow solution.

In a 250 ml four-necked round-bottomed flask provided with cooler, 8.67 g of $ZrCl_4$ (37.2 mmols) were introduced. After cooling to −196° C., 50 ml of tetrahydrofuran were condensed in it (very stark exothermic reaction). This was left to reach room temperature and then was heated under reflux for 40 minutes.

At room temperature and whilst stirring the solution of the lithium salt of the bisindenylethane was added to the solution of the adduct $ZrCl_4$/THF and the mixture was kept stirred for 20 hours in the dark.

At 0° C. gaseous HCl was bubbled in, thus obtaining a yellow solution together with a precipitate of the same colour. The solution was concentrated under vacuum by evaporating a part of the solvent, it was cooled to −20° C. and filtered off.

The precipitate was further purified by extraction with dichloromethane, thus obtaining 2.3 g (14.7%) of product.

c) Preparation of ethylene-bis(4,5,6,7-tetrahydroindenyl) zirconium dichloride

The method of preparation described in "F. R. W. P. Wild, M. Wasiucionek, G. Huttner and H. H. Brintzinger, J. Organomet. Chem. 288, 1985, 63" was followed.

A suspension of 1 g of ethylene-bis(indenyl)zirconium dichloride (2.4 mmols) and 80 mg of $PrO_2$ in 25 ml of $CH_2Cl_2$ was hydrogenated in autoclave under 100 bar H2 for half an hour at room temperature. The reaction mixture was diluted with 500 ml of $CH_2Cl_2$, was filtered off and the solvent was evaporated under vacuum.

The residue, after having been washed with pentane, was recrystallized from hot toluene. 640 mg (64%) of product were thus obtained.

DIMETHYLSILANDIYLBIS(4,5,6,7-TETRAHYDROINDENYL)ZIRCONIUM DICHLORIDE a) Preparation of bis(indenyl)dimethylsilane In a 1 liter 3-necked round-bottomed flask, provided with funnel and nitrogen tap, 30 ml of indene (257 mmols) and 300 ml of anhydrous tetrahydrofuran were fed. The mixture was cooled to −80° C. and 170 ml of n-butyllithium (1.6M in hexane, 272 mmols) were slowly added dropwise. The mixture was allowed to return to room temperature, was kept under agitation for 3 hours and was added to a solution of 15.6 ml (129 mmols) of dichlorodimethylsilane in 200 ml of tetrahydrofuran.

After being left to react overnight, this was treated with 20 ml of water. The phases were separated, the solvent was evaporated under vacuum and the residue was treated with hexane and dried on anhydrous sodium sulfate. After having evaporated the hexane, 38.5 g of red oily product which was purified by chromatografy on silica gel (eluent=hexane) were obtained. The yield was 18.8 g (51%).

b) Preparation of dimethylsilandiyl-bis(indenil)zirconium dichloride

The procedure described in "W. A. Heramann et al., Angew. Chem Int. Ed. Engl., 1989, 28, 1511" has been followed.

9.4 g of bis(indenyl)dimethylsilane (32.59 Mm) dissolved in 70 ml of anhydrous tetrahydrofuran were treated at −78° C. with slow dropwise addition of 40.7 ml of n-butyllithium (1.6M in hexane, 65.2 mmols), thus obtaining a green solution. This solution was allowed to return to room temperature while keeping under stirring for one hour.

The solution, which changed to red colour, was added dropwise over about one hour and at room temperature into a suspension of 12.4 g of $ZrCl_4.2THF$ (32.9 mmols) in 70 ml of anhydrous tetrahydrofuran and was left under stirring for 18 hours. An orange-yellow precipitate was formed.

The reaction mixture was reduced to half volume by evaporation of the solvent under vacuum, the precipitate was collected by filtration and washed first with a small quantity of tetrahydrofuran at −20° C. and then with some ethyl ether. The yield was 4.97 g (34%).

c) Preparation of dimethylsilandiyl-bis(4,5,6,7-tetrahydro indenyl)zirconium dichloride In a 250 ml test tube, 2,856 g of dimethylsilandiyl-bis(indenil)zirconium dichloride and 150 ml of $CH_2Cl_2$ were added under an inert atmosphere. After 15. minutes of stirring, an orange solution was obtained. To this solution, 127.5 mg of $PtO_2$ were added and, subsequently, it was transferred into a 250 ml glass autoclave, where it was left under 2 ata of $H_2$ for 1 hour, then 4 ata of $H_2$ for a further 3 hours. The reaction mixture was then filtered off, the residue was treated with 90 ml of toluene and filtered off again. The solid, after having been washed with pentane, was dried under vacuum. 1.092 g of product were obtained.

ETHYLENE-BIS(4,7-DIMETHYL-1-INDENYL)ZIRCONIUM DICHLORIDE a) Preparation of 4,7-dimethylindene The synthesis has been carried out according to the method described in "Organometallics, 1990, 9, 3098" (54% yield from p-xylene).

b) Preparation of 1,2-bis(4,7-dimethyl-3-indenyl)ethane 38.2 g (265 mmol) of 4,7-dimethylindene was dissolved in 350 ml of tetrahydrofuran and the solution was cooled to 0° C. Then 165 ml of n-butyllithium (1,6M in hexane, 264 mmol) was added dropwise over 2.5 hours. After warming to room temperature and stirring for 4 hours a purple solution of 4,7-dimethylindenyl-lithium was obtained. This solution was cooled to −70° C. and treated dropwise with 25,3 g of 1,2-dibromoethane (135 mmol) in 15 ml of tetrahydrofuran over 35 min. After warming to room temperature, a pale yellow solution was obtained, and then water was added. The organic phase was collected and dried over $Na_2SO_4$. The solvent was removed by vacuum evaporation to provide 20 g of crude product (48% yield).

c) Preparation of rac-ethylene-bis(4,7-dimethyl-1-indenyl) zirconium dichloride

A suspension of 10 g of 1,2-bis(4,7-dimethyl-3-indenyl) ethane (31.8 mmol) in 80 ml of tetrahydrofuran was added via cannula to a stirred suspension of 2,82 g of KH (70.3 mmol) in 160 ml of tetrahydrofuran.

After hydrogen generation had subsided, the resulting brownish solution was separated from excess KH. This solution and a solution of 12 g of $ZrCl_4(THF)_2$ (31.8 retool) in 250 ml of tetrahydrofuran were both added dropwise via cannula to a flask containing 50 ml of rapidly stirring tetrahydrofuran over 3 hours.

A yellow solution and a precipitate formed. After removing the solvent in vacuo, the orange-yellow residue (mixture of racemic and meso isomers 2.33:1 by $^1$H NMR) was extracted with $CH_2Cl_2$ until all orange product had dissolved. The 1.7 g of yellow solid resulted to be a single stereoisomer, namely the meso (11.3% yield).

Evaporation of $CH_2Cl_2$ from the orange solution gave 4.9 g of an orange solid corresponding to a mixture of 93.7% racemic and 6.3% meso isomers (32.5% yield). This solid was then recrystallized in toluene at −20° C.

BIS(INDENYL)ZIRCONIUM DICHLORIDE

All the operations were carried out under inert atmosphere. 7.0 ml of indene (60 mmols) were dissolved in 20 ml of anhydrous tetrahydrofuran, the solution was cooled to −78° C. and was treated with 40.0 ml of n-butyllithium (1.5M in hexane, 60 mmols). This was heated to room temperature, thus obtaining a red coloured solution.

In a 100 ml round-bottomed flask provided with reflux condenser, 7 g of $ZrCl_4$ (30 mmols) were cooled to −78° C. and treated with 30 ml of tetrahydrofuran (exothermic reaction). Thereafter, the whole was heated under reflux for 30 minutes, until a clear, brown coloured solution was obtained.

The solution of indenyl lithium was added, at room temperature, to the solution of the $ZrCl_4$/THF adduct. It was kept under stirring for 2 hours (a yellow suspension was formed) and thereafter the solvent was completely evaporated.

The residue was suspended in ethyl ether, was filtered off, washed repeatedly with ether and extracted with dichloromethane. The solution was dried and the product was washed with ether and then with pentane: 4.35 g of bisindenylzirconiumdichloride were thus obtained (36.8%).

METHYLALUMOXANE

Methylalumoxane (MAO) was used as a free flowing white powder obtained from commercial 30% w/w solution in toluene (Schering, MW 1400) by removing the volatiles under vacuum (4 hours, 40° C., 0.1 mmHg).

TETRAISOBUTYLDIALUMOXANE

Tetraisobutyldialumoxane (TIBAO) was a commercial product (30% w/w solution in cyclohexane from Schering AG) and was used as received.

POLYMERIZATION EXAMPLES

EXAMPLES 1-4

Into a 2.6 liter stainless-steel autoclave equipped with magnetic stirrer, manometer, temperature gauge, system for loading the catalyst and for feeding of the monomers, and thermostating jacket, previously purged with ethylene at 80° C., the quantities of water, 1-butene, ethylene and hydrogen reported in Table 1 were introduced. Parallel to this, a solution of the cocatalyst in toluene (0.2 g/cc) was added to dimethylsilandiyl-bis(fluorenyl)zirconium dichloride (2 ml solution/mg Zr). The obtained solution was kept under stirring for 5 minutes at a temperature of 2 0 o C, then the required amount was injected into the autoclave under a pressure of ethylene. Thereafter, a mixture ethylene/1-butene is fed in a ratio such that the relative concentration of ethylene and 1-butene in solution was kept constant. The temperature is then rapidly raised to the polymerization value. After the time indicated in Table 1, the polymerization reaction is stopped by injecting CO. After having purged the unreacted monomers, the solid product was dried under vacuum.

The polymerization conditions and the yields are reported in Table 1. The characterizations of the obtained polymers are reported in Table 2. No fouling was observed in the reactor.

EXAMPLES 5-8

The same procedure described in Examples 1-4 was carried out, except that a 4.0 l stainless-steel autoclave was used and that, instead of dimethylsilandiyl-bis(fluorenyl)zirconium dichloride, the zirconocenes indicated in Table 1 were used. When MAO was used as the alumoxane compound, 50% of the amount utilized was added in the autoclave before the catalyst addition.

The polymerization conditions and the yields are reported in Table 1. The characterizations of the obtained polymers are reported in Table 2. No fouling was observed in the reactor.

EXAMPLE 9

In a 1 liter stainless steel autoclave, 255 g of butene were introduced. The temperature was raised to 50° C. and a solution obtained by mixing 0.16 ml of a $4.34 \times 10^{-3}$M toluene solution of ethylene-bis(4,5,6,7-tetrahydroindenyl)zirconium dichloride and 2.45 ml of a 0.4M toluene solution of triisobutyl aluminium in 7.5 ml of toluene containing 1.12 mmols of $H_2O$ and precontacting the two solutions for 5 minutes, was introduced. Thereafter ethylene was fed until an overpressure of 4 atm was reached, which was maintained constant whilst stirring for 1 hour at 50° C. After removal of the unreacted monomer and drying, 7.90 g of amorphous polymer were obtained (I.V.=2.96). The butene content, determined by $^{13}$C NMR analysis, is 29.1% by mols. No fouling was observed in the reactor.

TABLE 1

| Example | Zirconocene | Zr (mmol · $10^{-3}$) | Al compound | Al (mmol) | $H_2O$ (mmol) | Al/Zr (mol) | $C_2$ liq. phase (g) | $C_2$ liq. phase (% w) |
|---|---|---|---|---|---|---|---|---|
| 1 | DMSBF | 6.97 | TIBAL | 6.97 | 3.48 | 1000 | 76.2 | 7.08 |
| 2 | DMSBF | 9.45 | TIBAO | 9.61 | — | 1017 | 123 | 12.0 |
| 3 | DMSBF | 15.30 | TIBAO | 15.6 | — | 1017 | 76.2 | 7.08 |

TABLE 1-continued

| | | | | | | | | |
|---|---|---|---|---|---|---|---|---|
| 4 | DMSBF | 8.36 | TIBAO | 8.36 | — | 1000 | 13.35 | 3.23 |
| 5 | EBTHI | 1.88 | TIBAL | 1.88 | 0.94 | 1000 | 50.4 | 4.8 |
| 6 | DMSBTHI | 4.38 | MAO | 8.76 | — | 2000 | 77 | 7.15 |
| 7 | rac-EBDMI | 14.75 | TIBAL | 14.75 | 7.37 | 1000 | 178.9 | 13.88 |
| 8 | BI | 2.19 | MAO | 4.38 | — | 2000 | 36.7 | 3.54 |

| Example | Zirconocene | $C_4$ liq. phase (g) | $C_4$ liq. phase (% w) | $H_2$ (% w) | P tot. (bar) | T (°C.) | t (min) | Yield (g) | Activity ($Kg/g_{Zr}/h$) |
|---|---|---|---|---|---|---|---|---|---|
| 1 | DMSBF | 1000 | 92.9 | 0.017 | 13.1 | 50 | 120 | 67 | 52.7 |
| 2 | DMSBF | 900 | 88.0 | 0.016 | 18.2 | 50 | 60 | 145 | 168.2 |
| 3 | DMSBF | 1000 | 92.9 | 0.017 | 13.1 | 50 | 60 | 276 | 197.4 |
| 4 | DMSBF | 400 | 96.7 | — | 8.7 | 50 | 60 | 75 | 98.3 |
| 5 | EBTHI | 1000 | 95.2 | — | 10.5 | 50 | 60 | 151 | 883.0 |
| 6 | DMSBTHI | 1000 | 92.8 | — | 13 | 50 | 60 | 387 | 1938.1 |
| 7 | rac-EBDMI | 1110 | 86.1 | — | 20 | 50 | 160 | 8 | 5.9 |
| 8 | BI | 1000 | 96.5 | — | 0.04 | 50 | 60 | 167 | 839.2 |

DMSBF = dimethylsilandiyl-bis(fluorenyl)zirconium dichloride
TIBAL = triisobutyl aluminium
EBTHI = ethylene-bis(4,5,6,7-tetrahydroindenyl)zirconium dichloride
TIBAO = Schering commerical product
DMSBTHI = dimethylsilandiyl-bis(4,5,6,7-tetrahydroindenyl)zirconium dichloride
EBDMI = ethylene-bis(4,7-dimethyl-1-indenyl)zirconium dichloride
BI = bis(indenyl)zirconium dichloride

TABLE 2

| Example | 1-butene (% mol) | I.V. (dl/g) | $M_W/M_n$ | density (g/cc) | Melting point (°C.) | $\Delta H_f$ (J/g) | Tension set 200% (%) | Tensile strenght (mPa) | Elongation at break (%) |
|---|---|---|---|---|---|---|---|---|---|
| 1 | 33.9 | 1.61 | n.d. | 0.8652 | — | 0 | n.d | n.d. | n.d. |
| 2 | 30.4 | 1.84 | n.d. | 0.8642 | — | 0 | 3 | 12.2 | 350 |
| 3 | 37.1 | 1.54 | 2.4 | 0.8634 | — | 0 | 2 | n.d. | n.d. |
| 4 | 43.8 | 1.45 | n.d. | n.d. | — | 0 | n.d. | n.d. | n.d. |
| 5 | 27.6 | 3.88 | n.d. | n.d. | — | 0 | n.d. | n.d. | n.d. |
| 6 | 23.8 | 1.11 | n.d. | n.d. | n.d. | n.d. | n.d. | n.d. | n.d. |
| 7 | 21.2 | 1.29 | n.d. | n.d. | n.d. | n.d. | n.d. | n.d. | n.d. |
| 8 | 41.9 | 1.10 | n.d. | n.d. | n.d. | n.d. | n.d. | n.d. | n.d. | n.d. = not determined

We claim:

1. A process for preparing an elastomeric ethylene-based copolymer, said process being free of observable fouling, said process comprising subjecting ethylene and 1-butene to a slurry polymerization reaction in a polymerization medium consisting essentially of liquid 1-butene and dissolved ethylene gas in the presence of a non-prepolymerized, non-supported catalyst, said catalyst comprising the product obtained by contacting:

A. a metallocene compound of the formula (I):

$$(C_5R^1{}_{5-m})R^2{}_m(C_5R^1{}_{5-m})MQ_2 \qquad (I)$$

wherein M is a metal selected from the group consisting of Ti, Zr and Hf; the $C_5R^1{}_{5-m}$ groups same or different from each other, are equally or differently substituted cyclopentadienyl rings; the substituents $R^1$, same or different from each other, are hydrogen atoms, alkyl, alkenyl, aryl, alkylaryl or arylalkyl radicals containing from 1 to 20 carbon atoms, which may also contain Si or Ge atoms, or $Si(CH_3)_3$ groups, or two or four substituents $R^1$ of the same cyclopentadienyl ring can form one or two rings having from 4 to 6 carbon atoms; $R^2$ is a bridging group which links the two cyclopentadienyl rings and is selected from the group consisting of $CR^1{}_2$, $C_2R^1{}_4$, $SiR^1{}_2$, $Si_2R^1{}_4$, $GeR^1{}_2$, $Ge_2R^1{}_4$, $R^1{}_2SiCR^1{}_2$, $NR^1$ or $PR^1$, wherein the substituents $R^1$, same or different from each other, are defined as above; the substituents Q, same or different from each other, are hydrogen, halogen atoms, OH, SH, $R^1$, $OR^1$, $SR^1$, $NR^1{}_2$, or $PR^1{}_2$, wherein the substituents $R^1$, same or different from each other, are defined as above; and m can be 0 or 1; and B. an alumoxane compound, or at least one compound capable of reacting with the metallocene compound to give a cationic alkyl metallocene.

2. The process according to claim 1, wherein the mixture for the slurry polymerization reaction comprises a minor amount of a polyene.

3. The process according to claim 1, wherein the metallocene compound of the formula (I) is pre-reacted with an organoaluminum compound of the formula (II):

$$AlR^3{}_{3-z}H_z \qquad (II)$$

wherein the substituents $R^3$, same or different from each other, are alkyl, alkenyl or alkylaryl radicals containing from 1 to 10 carbon atoms, which may also contain Si or Ge atoms, and z can be 0 or 1.

4. The process according to claim 1, wherein the alumoxane compound is in admixture with an organoaluminum compound of the formula (II):

$$AlR^3{}_{3-z}H_z \qquad (II)$$

wherein z and the substituents $R^3$ are as defined in claim 3.

5. The process according to claim 1, wherein the metal M in the metallocene compound of the formula (I) is zirconium.

6. The process according to claim 1, wherein the substituents Q in the metallocene compound of the formula (I) are chlorine atoms or methyl groups.

7. The process according to claim 1, wherein the metallocene compound is selected from the group consisting of ethylene-bis(4,5,6,7-tetrahydroindenyl)zirconium dichloride and dimethylsilandiyl-bis(fluorenyl)zirconium dichloride.

8. The process according to claim 1, wherein, after completion of the slurry polymerization reaction, the following further steps are performed:

flashing of the unreacted ethylene from the suspension of the polymer in the reaction medium;

raising of the temperature of said suspension until a solution of the polymer is formed in the reaction medium;

recovering of the polymer from said solution by evaporation of the butene solvent.

9. The process according to claim 8, wherein the step of recovering the polymer is performed in a devolatilizing extruder.

* * * * *